United States Patent [19]

Beiswenger

[11] Patent Number: 5,222,153
[45] Date of Patent: Jun. 22, 1993

[54] APPARATUS FOR MATCHING A FINGERPRINT USING A TACKY FINGER PLATEN

[75] Inventor: John L. Beiswenger, Salem, Wis.

[73] Assignee: ThumbScan, Inc., Lombard, Ill.

[21] Appl. No.: 810,433

[22] Filed: Dec. 18, 1991

Related U.S. Application Data

[63] Continuation of Ser. No. 653,778, Feb. 11, 1991, abandoned, which is a continuation of Ser. No. 522,470, May 11, 1990, abandoned, which is a continuation of Ser. No. 241,026, Sep. 2, 1988, abandoned.

[51] Int. Cl.⁵ .............................................. G06K 9/00
[52] U.S. Cl. ............................................ 382/4; 356/71
[58] Field of Search ........................... 382/2, 4, 5, 31; 356/71

[56]        References Cited
       U.S. PATENT DOCUMENTS

| | | | |
|---|---|---|---|
| 3,443,098 | 5/1969 | Lewis | 350/285 |
| 3,603,794 | 9/1971 | Mast | 250/213 R |
| 3,627,991 | 12/1971 | Beall et al. | 235/61.11 E |
| 3,865,488 | 2/1975 | Del Rio | 356/71 |
| 3,944,978 | 3/1976 | Jensen et al. | 356/71 |
| 4,053,228 | 10/1977 | Schiller | 382/4 |
| 4,120,585 | 10/1978 | DePalma et al. | 356/71 |
| 4,322,163 | 3/1982 | Schiller | 356/71 |
| 4,336,998 | 6/1982 | Ruell | 356/71 |
| 4,340,300 | 7/1982 | Ruell | 356/71 |
| 4,358,677 | 11/1982 | Ruell et al. | 250/216 |
| 4,385,831 | 5/1983 | Ruell | 356/71 |
| 4,414,684 | 11/1983 | Blonder | 382/4 |
| 4,428,670 | 1/1984 | Ruell et al. | 356/71 |
| 4,544,267 | 10/1985 | Schiller | 356/71 |
| 4,569,080 | 2/1986 | Schiller | 382/4 |
| 4,832,485 | 5/1989 | Bowles | 382/5 |

OTHER PUBLICATIONS

IBM Technical Disclosure Bulletin, vol. 8, No. 1, Jun. 1965.

Primary Examiner—Leo H. Boudreau
Assistant Examiner—Chris Kelley
Attorney, Agent, or Firm—Roper & Quigg

[57]           ABSTRACT

In a fingerprint matching system, a finger platen formed of an optical element having a tacky reading surface for providing an accurate and consistent image of a fingerprint pattern.

16 Claims, 3 Drawing Sheets

APPARATUS FOR MATCHING A FINGERPRINT USING A TACKY FINGER PLATEN

This is a continuation of application Ser. No. 653,778 filed Feb. 11, 1991 and now abandoned; which is a continuation of Ser. No. 522,470 of May 11, 1990, which is now abandoned; which is a continuation of Ser. No. 241,026 of Sep. 2, 1988, which is now abandoned.

This invention relates generally to the field of fingerprint matching and, more particularly, fingerprint matching apparatus using a platen on which the finger is placed in order to permit the apparatus to sense the pattern of ridges in the fingerprint.

Generally, fingerprint matching can be applied as a verification technique where a live fingerprint is compared with a known fingerprint to determine whether the live fingerprint is the same as the known fingerprint, or fingerprint matching can be applied as an identification technique where the live fingerprint is compared with each one of a collection of known fingerprints to determine whether the live fingerprint is within the collection of fingerprints and, if so, which of the known fingerprints corresponds to the tested fingerprint.

Fingerprint matching in the context of the identification or verification of a person's identity is a burgeoning industry. While most often associated with security in sensitive government and commercial installations, matching fingerprints for personal identification has potential application wherever a person's identity needs to be identified or verified, e.g., in the control of access to physical locations such as nuclear power stations, airports and other transportation facilities, industrial locations and in the home; in the control of access to computing and data management equipment; and in banking or commercial transactions.

In an automatic fingerprint matching system, the live fingerprint typically is scanned and digitally recorded as a binary, i.e., two-tone, image of the fingerprint pattern. Characteristic features of the fingerprint pattern, such as ridge endings, points of ridge bifurcation, and the core of a whorl—collectively called the minutiae of the fingerprint pattern—are found in the binary fingerprint image and then compared with master minutiae that have been derived previously from a fingerprint of the authorized person in order to determine whether there is a match.

Obviously, the accuracy and consistency with which a fingerprint matching system identifies the individual minutiae in a fingerprint directly affects the accuracy and consistency with which the system can match fingerprints. In a fingerprint matching system using a finger platen such as a prism, glass plate, or other optical element, the detection of fingerprint minutiae depends on sensing the differences in internal reflection of a light source illuminating the back or side of the optical element, between the areas of the face of the optical element in contact with the fingerprint ridges and the areas of the face of the optical element not in contact with the fingerprint ridges.

The use of an optical element having a hard surface, e.g., glass or a hard polymer, sometimes does not provide satisfactory contact of the ridges in a fingerprint pattern with the platen surface. This is due to spaces between the surface of the optical element and the fingerprint ridges such as may be caused by uneven ridge height, air pockets, or cuts or other deformities in the finger.

Better contact can be achieved by pressing the finger harder against the optical element, but at the price of distorting the live fingerprint pattern as the pattern is spread out and perhaps slid or twisted. Further, the ridges in portions of the fingerprint may be flattened entirely by pressing too hard, thereby eliminating minutiae sought to be identified. To some extent, a better contact can be obtained between the fingerprint ridges and the surface of the optical element by first moistening the finger. However, this is messy, may lead to an undesirable accumulation of the moistening agent and/or dirt on the optical element, and requires a supply of the moistening agent as well as some means of cleaning the finger.

Another approach to obtaining a better contact between the fingerprint ridges and the optical element is to provide a pliable or resilient optical element. Owing to its pliability, the optical element can deform slightly to increase the contact area with a finger in response to finger pressure. Although this approach is more satisfactory than using a hard optical element in many applications, the finger must be pushed with moderate pressure against the optical element, thereby risking spreading and distortion of the fingerprint pattern. Also, the pliable optical element does not effectively improve contact with the fingerprint ridges at local sites having a significant variation of ridge height.

The present invention is a novel optical element for use as a finger platen in a fingerprint matching apparatus which increases the contact between the fingerprint ridge pattern and the optical element by providing a tacky surface on the optical element on which the finger is placed. Owing to the tacky surface, the fingerprint ridge pattern is more completely in optical contact with the platen as the contacted surface of the optical element "grabs" the fingerprint ridges and maintains contact with the fingerprint ridges despite local variations in ridge height and minor deformities in the fingerprint ridges. Also, the finger need not be pressed hard onto the optical element, thereby avoiding the spreading and distortion of the fingerprint pattern. Therefore, the present invention is able to provide a more complete, accurate, and consistently reproducible image of the fingerprint pattern, thereby increasing the accuracy and consistency of the fingerprint matching apparatus.

BRIEF DESCRIPTION OF THE DRAWINGS

The above and other features and advantages of the invention as well as a fuller description of the invention itself will become more apparent to those skilled in the art in view of the following detailed description taken together with the accompanying drawings in which like referenced numerals and labels indicate corresponding parts or elements throughout the several views.

DETAILED DESCRIPTION

Figure 1:
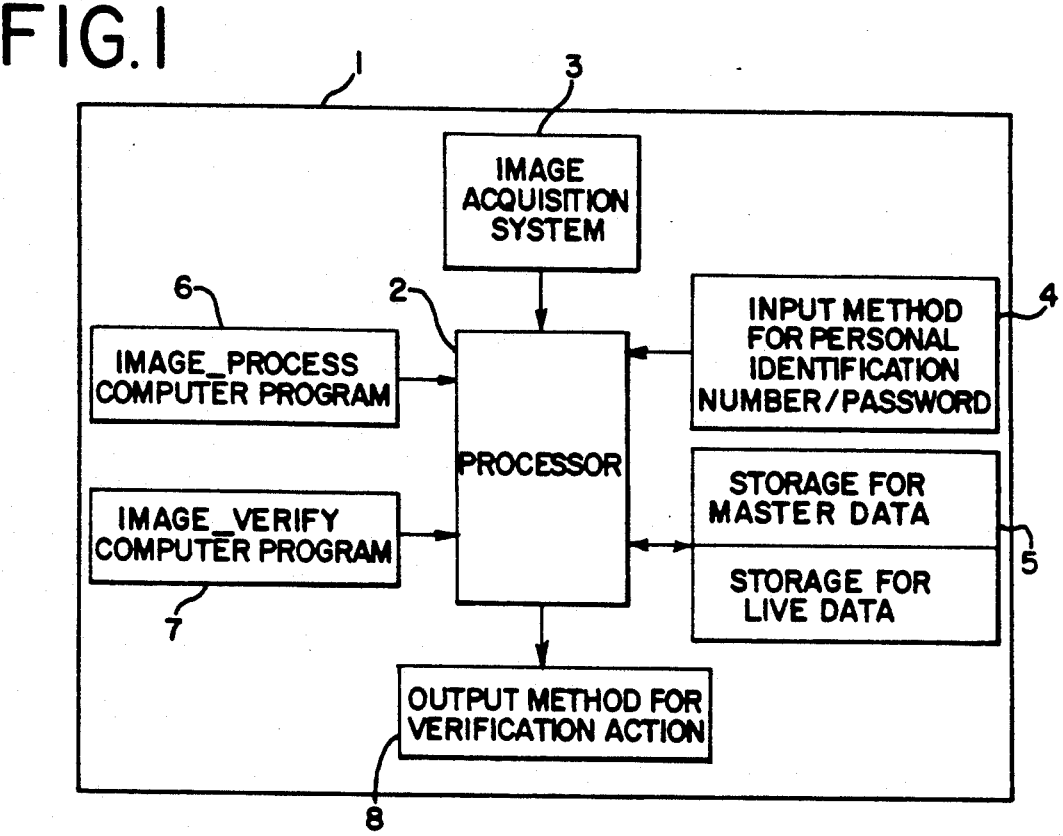
FIG. 1 is a functional block diagram of a stand-alone fingerprint matching system.
Figure 2:
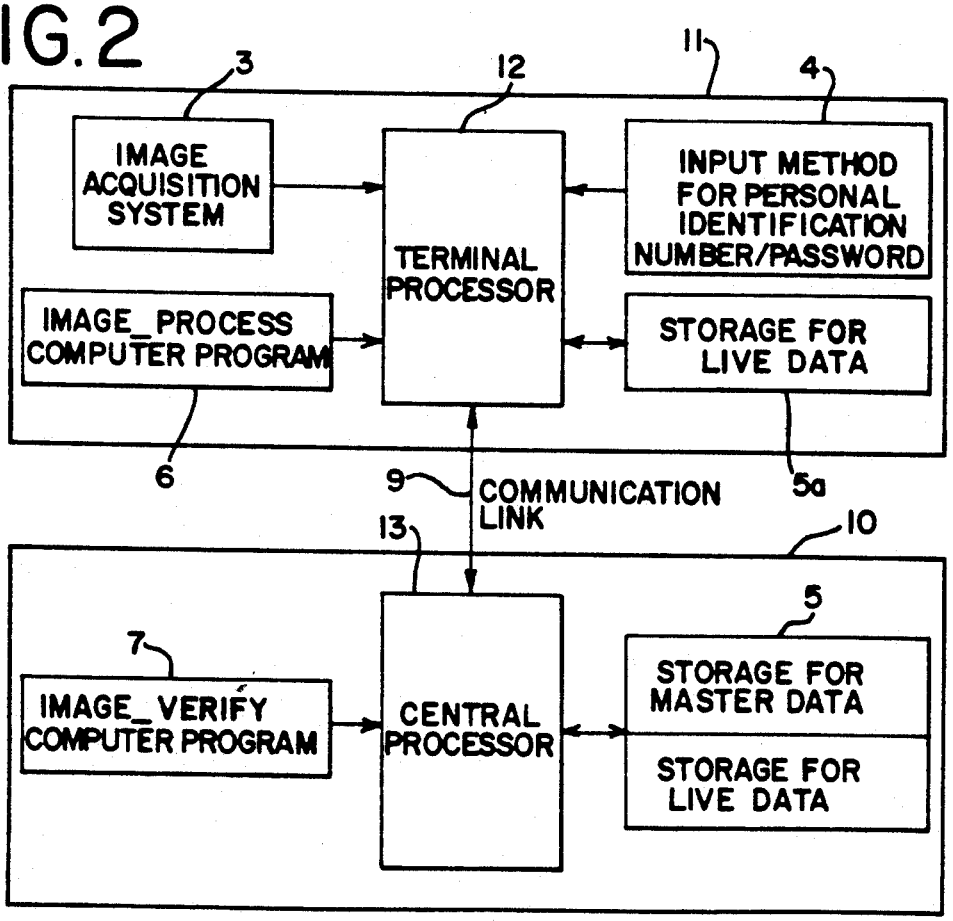
FIG. 2 is a functional block diagram of a fingerprint matching system including one or more remote terminals for the entry of live fingerprint images.

Turning now to the drawings, FIG. 1 and FIG. 2 show two exemplary types of system for matching fingerprints. FIG. 1 represents a stand-alone system 1 in which the live fingerprint to be tested is acquired at the same location that the matching is to be done, whereas FIG. 2 represents a system having a central station 10 connected by a suitable communication link 9 with one or more remote terminals 11. Two techniques for implementing such fingerprint matching systems are described in more detail in application Ser. Nos. 055,145 and 194,045 both abandoned and, both entitled Apparatus And Method For Matching Image Characteristics Such As Fingerprint Minutiae and owned by a common assignee of the present application. The specific technique implemented in the fingerprint matching system is not a part of the present invention, however; the invention can be used in any fingerprint matching system which requires the fingerprint ridge pattern to be in contact with the surface of a finger platen. Indeed, the present invention may be used on a fingerprint sensing system that does not itself perform any matching. Thus, the description provided herein of a fingerprint matching system using the invention is intended to be illustrative only and does not limit the scope of application of the invention.

Returning to FIG. 1, the stand-alone system 1 contains an image acquisition system 3, an input method 4 for receiving a personal identification code, and an output method 8 for initiating a desired action based on the outcome of the attempt to match. The matching system 1 also contains a processor 2, a storage 5 for the live fingerprint data and a library of sets of master fingerprint data, as well as the IMAGE PROCESS program 6 and the IMAGE_VERIFY program 7 that operate in conjunction with the processor 2 to extract characteristic minutiae of a fingerprint and compare the live fingerprint data to the master fingerprint data.

The embodiment shown in FIG. 2 basically comprises one or more remote terminals 11, each of which is connected by a suitable communication link 9 to the central station 10. The terminals 11 are identical, and will be described in terms of a single terminal 11. The terminal 11 acquires the live fingerprint image to be tested, processes the image to obtain its characteristic minutiae and transmits the characteristic minutiae of the live fingerprint image to the central station 10 to be evaluated for a match. The terminal 11 includes the image acquisition system 3, the input method 4, a local storage 5a for storing characteristic minutiae of the live fingerprint image, a terminal processor 12, and the IMAGE_PROCESS program 6. The terminals may be stationed at any location where physical access is to be controlled or personal identification is required, e.g., computer terminals, building entry points, automatic banking tellers. The central station 10 includes the equipment and programming that is necessary to evaluate the live fingerprint data received from a remote terminal, which are a central processor 13, the storage 5 and the IMAGE_VERIFY program 7.

In general, to verify his or her identity, a person activates the matching system by entering a personal identification code or number (PIN) that is uniquely assigned to the person. This is done through the input method 4, which may be a keyboard, keypad, card reader or other conventional method. The person then places a selected finger on a fingerprint reader at the terminal. Each remote terminal 11 includes an image acquisition system 3 for "reading" the fingerprint, forming a binary image thereof and storing the image in a suitable random access memory (not shown).

After the binary image of the live fingerprint pattern is obtained and stored, the IMAGE_PROCESS program 6 in the remote terminal 11 processes the image to simplify the digitized fingerprint pattern and also to identify the characteristic point or minutiae of the fingerprint. The fingerprint pattern that is stored as a binary image is formed of ridges that may be more than one pixel in width. The simplification procedure essentially reduces the fingerprint pattern to a skeleton of ridges all of only one pixel width. Given the "thinned" skeleton image of a fingerprint, the X,Y coordinates of characteristic minutiae are identified. The resulting list of minutiae points constitutes the fingerprint data that is transmitted to the central station 10 for evaluation.

A library of fingerprint data for the persons expected to be using the system is stored on any suitable nonvolatile storage medium at the storage 5 and is available to the central processor 13. The PIN of the person requesting verification of identity is used by the central processor 13 to locate and retrieve the master fingerprint data for the person whose identification number was entered. For enrollment in the system, each person essentially has his or her selected finger read and processed (as described above) a number of times until consistent data representative of a master fingerprint are obtained.

After obtaining the master fingerprint data, the central processor 13 operates under the control of the IMAGE_VERIFY program 7 to attempt to match the live fingerprint data with the master fingerprint data. On the occurrence of a suitable match the person's identity is deemed to be verified, and a signal is sent from the central station 10 back to the remote terminal 11 that requested the verification to identify the match. Acting on this signal, the remote terminal 11 can then permit access to a guarded site, signify that a verification has been made for the benefit of a human operator (e.g., bank teller or airport security guard), enable the operation of computer equipment, etc.

Figure 3:
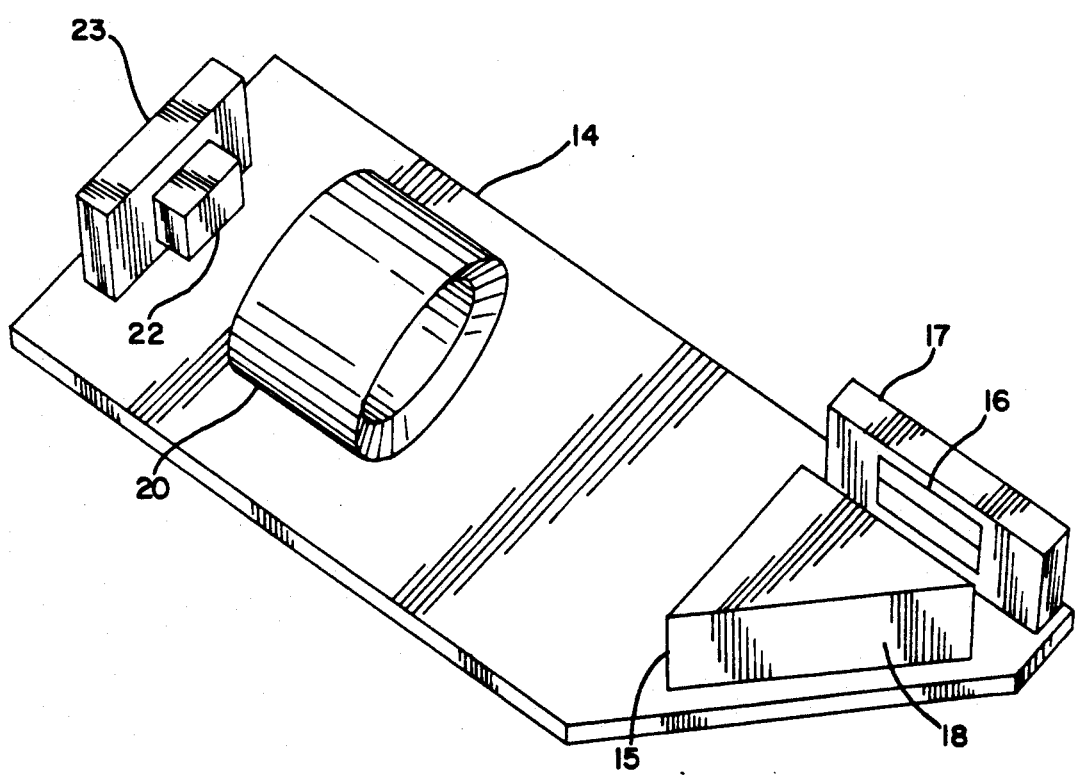
FIG. 3 is a diagram of an optics assembly that may be used to obtain a fingerprint image.

The image acquisition system 3 contains an optics assembly for sensing and recording the live fingerprint image. An example of a suitable optics assembly is shown in FIG. 3. The components of the optics assembly are mounted on the base plate 14. An array 16 of LEDs, housed in the frame 17, illuminates the diagonal face 18 of an optical element 15, i.e., the right angle prism, from behind. In operation, a user places his or her finger on the diagonal face 18 of the prism 15 which serves as a platen and establishes a reading surface. Light from the LED array 16 is shone on the back of the diagonal face of the prism 15. Where a valley occurs in the fingerprint the skin is not touching the prism; the light from the LED array 16 impinging on the reading surface 18 of the prism at these locations are reflected internally in the prism, through the lens 20 and onto a total imaging device 22 which is mounted on the frame 23. Where a ridge occurs in the fingerprint the skin touches the prism and the light from the LED array 16 is not reflected onto the imaging device 22. Thus a high contrast image of the fingerprint is focused by the lens 20 onto the imaging device. The fingerprint image is then stored in a suitable digital memory as a binary image, a two-tone picture of the ridge and valley pattern of the live fingerprint.

The imaging device 22 is preferably a total image sensor that is capable of sensing an image and translating it into a binary image. One such device is the IS32 OpticRam procured by Micron Technology, inc., of Boise, Id. In the case of the IS32 imaging device, the sensor itself can be used as a memory so that a separate memory to store the binary image is not necessary.

Alternatively, any other imaging system may be used to sense and record the fingerprint image. For example, this may be a system in which the fingerprint image is produced by the internal reflection technique previously described and scanned in raster fashion, using a single photodetector or a linear array of photodetectors to translate the pattern of light falling on it into electrical signals. Typically, a pivoting mirror is used to move the fingerprint image over the stationary photodetector device. As an alternative total imaging device, a two dimensional array of charge coupled devices (CCDs) may be used, and the analog output signal thereof may be processed in any known manner to obtain a digital representation of the sensed image.

The present invention is an improved finger platen that may be used in a fingerprint matching system such as the one described above. To improve the contact between the fingerprint ridges and the surface of the reading surface 18 of the optical element 15, the reading surface 18 is adapted to be tacky so that the fingerprint ridges are, in effect, "grabbed" and maintained in optical contact with the optical element 15, regardless of local variations in ridge height in the fingerprint pattern. By "optical contact", I mean the fingerprint ridge is adjacent the reading surface 18 so that, when the reading surface 18 is illuminated from behind or the side, the presence of the fingerprint ridge interferes with the internal reflection of the illumination from the back of the reading surface 18 in the area of optical contact.

Figure 4:
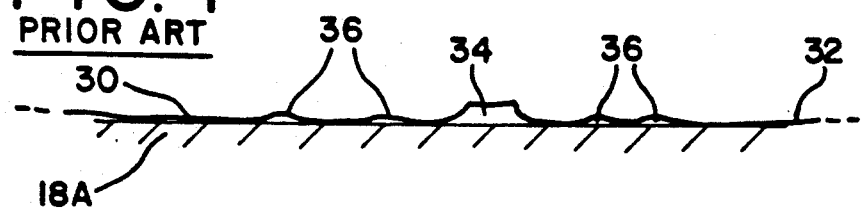
FIG. 4 shows representative fingerprint ridges in contact with a conventional hard finger platen reading surface.
Figure 5:
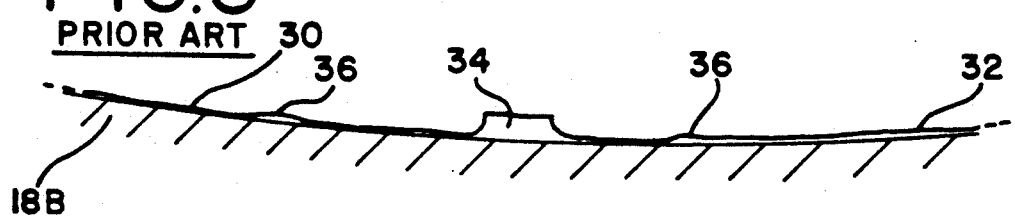
FIG. 5 shows the same representative fingerprint ridges in contact with a pliable finger platen reading surface.
Figure 5A:
FIG. 5A shows the resulting area of the reading surface that is in contact with the fingerprint ridges.
Figure 6:
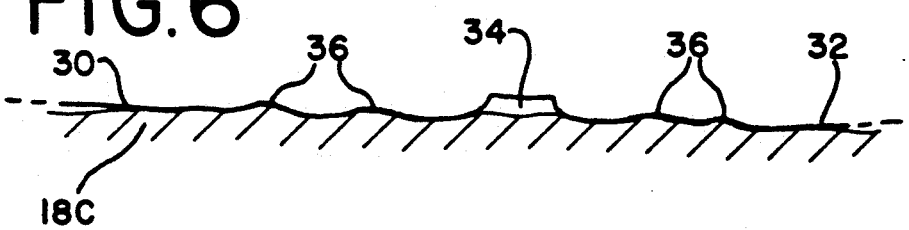
FIG. 6 shows the same representative fingerprint ridges in contact with a finger platen reading surface in accordance with the invention.

One way to view the effect of the invention is that the tacky reading surface 18 adapts to local variations of ridge height in a fingerprint pattern by filling in the shallower portions of the fingerprint ridges when the finger is placed against the reading surface 18. By way of contrast, FIG. 4 shows successive fingerprint ridges 30, 32 pressed against a hard platen reading surface 18A, FIG. 5 shows the same fingerprint ridges 30, 32 pressed against a pliable platen reading surface 18B, and FIG. 6 shows the same fingerprint ridges 30, 32 pressed against a tacky platen reading surface 18C in accordance with the invention. The space 34 represents the valley portion of the fingerprint existing between the end points of ridges 30, 32 and the areas 36 represent local variations in height or deformities in the ridges 30, 32.

Figure 4A:
FIG. 4A shows the resulting area of the reading surface that is in contact with the fingerprint ridges.

When the platen reading surface is hard as shown in FIG. 4, the areas 36 of the fingerprint ridges may not be in contact with the surface 18A. FIG. 4A shows the resulting area of the reading surface 18A that is in contact with the ridges shown in FIG. 4. This is undesirable because the areas 36 show up as breaks in the ridges, thereby signifying false ridge endings in the fingerprint pattern. Pushing the finger harder against the platen reading surface may cause some of the shallower of the areas 36 to come into contact with the surface 18A, but the increased finger pressure also serves to spread and distort the fingerprint, thereby making an accurate evaluation and matching of the fingerprint more difficult.

As shown in FIG. 5 if the reading surface 18B is pliable, it would tend to adjust to the fingerprint somewhat under finger pressure and could come into contact with some of the shallower of the areas 36 of the fingerprint ridges, but would not be effective in causing the areas 36 of more significant ridge height variation to contact the reading surface.

Figure 6A:
FIG. 6A shows the resulting area of the reading surface that is in contact with the fingerprint ridges.

In the present invention, as illustrated in FIG. 6, the portion of the reading surface 18C that is to be contacted by the finger is tacky so that the fingerprint ridges as illustrated in FIG. 6 are in contact with the reading surface with little or no finger pressure, resulting in an accurate contact area as shown in FIG. 6A. Thus, false ridge endings are avoided in obtaining the image of the fingerprint pattern, and the evaluation and matching of the fingerprint can be conducted with greater accuracy and consistency.

In an actual embodiment of the invention, the reading surface of the prism is coated with a thin silicon coating, such as Hipec Brand Q1-4939 Semiconductor Protective Coating manufactured by Dow Corning Corporation. A coating thickness of 0.02 inch was found to be desirable, and a resin to curing agent ratio of approximately 4:1 achieved a suitable degree of tackiness. This coating maintains its tackiness indefinitely and can be cleaned simply with water or soap and water without affecting the tackiness. Although the actual embodiment utilizes only a thin coating of the tacky material, it is possible that a thicker layer of the tacky material may be used or the entire optical element may be formed of the tacky material. However, it is believed to be preferable to have the optical element formed of a relatively hard material, with a thin tacky coating applied to the reading surface of the optical element. This way, any optical distortion of the fingerprint image caused by a distortion of a resilient optical element when a finger is pressed on it during use can be avoided. Alternatively, the tacky coating can be provided on a glass or hard polymer plate in a replaceable cartridge form that can be placed on a conventional optical element.

While there has been illustrated and described what is at present considered to be a preferred embodiment of the present invention, it will be understood by those skilled in the art that various changes and modifications may be made without departing from the true scope of the invention. In addition, modifications may be made to adapt the teaching of the invention to a particular application without departing from the central scope of the invention.

For example, the invention may be used in an automatic or a manual fingerprint matching system used for either identifying or verifying a person's identity. The invention may also be used as part of a fingerprint imaging system that is used only to sense a fingerprint pattern, regardless of whether the sensed fingerprint pattern is sensed visually by a person, recorded by electro-optical means as described hereinabove, or recorded by some other means. Further, the invention can be used to sense other dermatological patterns that are subject to local height or thickness variations, such as palm prints or toe prints.

Although the exemplary matching system described above utilized the physical principle known as "total internal reflection" in conjunction with a right angle prism to sense the fingerprint pattern in contact with the platen reading surface, other sensing techniques can be used within the spirit of the invention. For example, the platen may be in the form of a slab that is illuminated from its edge, i.e., generally parallel to the reading surface. In general, the invention can be used in any sensing system where the accuracy of the sensed fingerprint pattern depends on the fingerprint ridges being in contact with the platen reading surface.

Therefore, it is intended that this invention not be limited to the particular embodiment disclosed as the best mode contemplated for carrying out this invention, but that the invention will include all elements falling within the scope of the appended claims.

I claim:

1. A fingerprint matching apparatus comprising an optical element having a reading surface adapted to receive a finger, a light source for illuminating the optical element, and a sensor for sensing the fingerprint ridge pattern when a finger is placed on the reading surface, wherein at least a portion of the reading surface is sufficiently tacky to grip the fingerprint ridges and maintain contact with the fingerprint ridges to adapt to local variations of ridge height and minor deformities in the fingerprint ridge pattern thereby filling in the shallower portions of the ridges when the finger is placed on the tacky reading surface.

2. An apparatus as described in claim 1 wherein the tacky portion of the reading surface is a tacky coating.

3. An apparatus as described in claim 2 wherein the tacky coating is approximately 0.02 inch.

4. An apparatus as described in claim 1 wherein the optical element is a prism.

5. An apparatus for sensing a fingerprint ridge pattern comprising an optical element having a reading surface, a source of illumination for illuminating the optical element, and a means for sensing the illumination reflected within the optical element when a fingerprint ridge pattern is placed on the reading surface, wherein at least a portion of the reading surface is sufficiently tacky to grip the fingerprint ridges and maintain contact with the fingerprint ridges thereby to make optical contact with portions of the fingerprint ridges having local variations in height.

6. An apparatus as described in claim 5 in which the back of the reading surface is illuminated at an angle such that the illumination is substantially reflected when no fingerprint ridge pattern is placed on the reading surface and is substantially not reflected at portions of the reading surface in optical contact with the fingerprint ridges when a fingerprint ridge pattern is placed on the reading surface.

7. An apparatus as described in claim 5 in which the optical element is illuminated substantially parallel to the reading surface.

8. An apparatus as described in claim 5 in which the optical element includes as its reading surface a tacky coating.

9. An apparatus for sensing a fingerprint ridge pattern comprising an optical element having a reading surface for receiving a finger, a light source for illuminating the optical element, and a sensor for sensing optically the fingerprint ridge pattern of a finger placed against the reading surface, wherein the reading surface following curing is sufficiently tacky to grip the fingerprint ridges and maintain contact with the fingerprint ridges thereby to make optical contact with portions of the fingerprint ridges having local variations in height.

10. An apparatus as described in claim 9 in which the tacky reading surface is formed of a silicon polymer.

11. An apparatus as described in claim 1 wherein the optical element is substantially not pliable.

12. An apparatus as described in claim 1 wherein the optical element is pliable.

13. An apparatus as described in claim 5 wherein the optical element is substantially not pliable.

14. An apparatus as described in claim 5 wherein the optical element is pliable.

15. An apparatus as described in claim 9 wherein the optical element is substantially not pliable.

16. An apparatus as described in claim 9 wherein the optical element is pliable.

* * * * *